(12) United States Patent
McDonald et al.

(10) Patent No.: US 8,802,043 B2
(45) Date of Patent: Aug. 12, 2014

(54) METHOD FOR CONTROLLING ACIDIC COMPOUNDS PRODUCED FOR OXY-COMBUSTION PROCESSES

(71) Applicant: Babcock & Wilcox Power Generation Group, Inc., Barberton, OH (US)

(72) Inventors: Dennis K McDonald, Massillon, OH (US); Arthur E O Darde, Paris (FR); Richard Dubettier, La Varenee Saint Hilaire (FR)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 13/929,971

(22) Filed: Jun. 28, 2013

(65) Prior Publication Data

US 2014/0000311 A1    Jan. 2, 2014

Related U.S. Application Data

(60) Provisional application No. 61/665,886, filed on Jun. 28, 2012.

(51) Int. Cl.
| | |
|---|---|
| *B01D 53/40* | (2006.01) |
| *B01D 53/50* | (2006.01) |
| *B01D 53/56* | (2006.01) |
| *B01D 53/62* | (2006.01) |
| *B01D 53/68* | (2006.01) |

(52) U.S. Cl.
USPC ............ 423/210; 423/242.1; 423/239.1; 423/240 R; 423/220; 423/235

(58) Field of Classification Search
CPC ...... B01D 53/002; B01D 53/40; B01D 53/50; B01D 53/56; B01D 53/62; B01D 53/68
USPC ........ 423/210, 242.1, 239.1, 240 R, 235, 220
See application file for complete search history.

(56) References Cited

U.S. PATENT DOCUMENTS

| | | | | |
|---|---|---|---|---|
| 5,284,605 | A * | 2/1994 | Nicolas | 588/1 |
| 5,344,627 | A * | 9/1994 | Fujii et al. | 423/220 |
| 7,544,337 | B2 * | 6/2009 | Ogura et al. | 423/210 |
| 7,927,568 | B2 * | 4/2011 | Fan et al. | 423/220 |
| 8,535,630 | B2 * | 9/2013 | Wen et al. | 423/220 |
| 2013/0230440 | A1 * | 9/2013 | Katz et al. | 423/210 |
| 2013/0315807 | A1 * | 11/2013 | Vera-Castaneda | 423/210 |

* cited by examiner

*Primary Examiner* — Timothy Vanoy
(74) *Attorney, Agent, or Firm* — Michael J. Seymour; Eric Marich

(57) ABSTRACT

The present invention relates generally to the field of emissions control and, in particular to a new and useful method and/or system by which to control, treat and/or mitigate various liquid-based acidic compounds that are produced during oxy-combustion (e.g., during a compression step and/or cooling step) from various gaseous acid compounds and/or gaseous acid precursor compounds (e.g., $SO_x$, $NO_x$, etc.). In one embodiment, the present invention relates to a method and/or system by which such one or more liquid-based acid compounds are recycled into the flue gases and/or into one or more of the emissions control and/or flue gas treatment equipment of an oxy-combustion power generation system.

33 Claims, 5 Drawing Sheets

METHOD FOR CONTROLLING ACIDIC COMPOUNDS PRODUCED FOR OXY-COMBUSTION PROCESSES

RELATED APPLICATION DATA

This patent application claims priority to and is a non-provisional of U.S. Provisional Patent Application No. 61/665,886 filed Jun. 28, 2012 and titled "Method for Controlling Acidic Compounds Produced from Oxy-Combustion Processes." The complete text of this patent application is hereby incorporated by reference as though fully set forth herein in its entirety.

FIELD AND BACKGROUND OF THE INVENTION

1. Field of the Invention

The present invention relates generally to the field of emissions control and, in particular to a new and useful method and/or system by which to control, treat and/or mitigate various liquid-based acidic compounds that are produced during one or more post-combustion phases, or post-combustion processes, of oxy-combustion (e.g., during a compression step and/or cooling step) from various gaseous acid compounds and/or gaseous acid precursor compounds (e.g., $SO_x$, $NO_x$, etc.). In one embodiment, the present invention relates to a method and/or system by which such one or more liquid-based acid compounds are recycled into the flue gases and/or into one or more of the emissions control and/or flue gas treatment equipment of an oxy-combustion power generation system.

2. Description of the Related Art

As is well known, the use of coal for the generation of power has various drawbacks. One such drawback is the creation of carbon dioxide, a greenhouse gas emission, a gas that many believe adds to the growing problem of global warming. In light of this various technologies have been developed to employ carbon capture, utilization or storage (CCUS) as one way to address global climate concerns. In connection with such concerns various technologies for carbon capture have been investigated including oxy-combustion.

As known to those of skill in the art, oxy-fuel combustion (or oxy-combustion) is the process of burning a fuel using an oxidant with less nitrogen than atmospheric air (e.g., a combination of flue gas and oxygen, pure oxygen, or a combination of oxygen and one or more inert gases), instead of air, or atmospheric air, as the primary oxidant. Since the nitrogen component of air is either reduced, or not present, the nitrogen component of the air is either not converted to nitrogen oxides, or in the case of total oxy-combustion not present to be heated.

In the field of power generation research has turned to the use of oxy-combustion for power generation using one or more fossil fuels, or carbonaceous fuels, as the combustion fuel. There is currently research being done in firing fossil-fueled power plants with a nitrogen-depleted gas, or gas mixture, instead of air. In one such proposed process, almost all of the nitrogen is removed from input air, yielding a stream that is approximately 95 percent oxygen and subsequently mixed with, for example, re-circulated flue gas. Firing with pure oxygen can in some circumstances result in too high a flame temperature, so the mixture is diluted by mixing with recycled flue gas. The recycled flue gas (RFG) can also be used to carry fuel into the boiler and to ensure adequate convective heat transfer. Oxy-fuel combustion produces approximately 75 percent less flue gas than air fueled combustion and produces exhaust consisting primarily of $CO_2$ and $H_2O$.

The justification for using oxy-fueled combustion, or oxy-combustion, is to produce a $CO_2$ rich flue gas ready for purification, compression and/or sequestration. Oxy-fuel combustion has significant advantages over traditional air-fired plants. Among the non-limiting advantages are: (i) the mass and volume of the products of combustion, which essentially comprise the flue gas leaving the process, are reduced by approximately 75 percent; (ii) the size of the flue gas compression and purification equipment can be reduced by approximately 75 percent; (iii) the flue gas is primarily $CO_2$, suitable for separation and treatment for use or sequestration via, for example, converting the $CO_2$ into a liquid or supercritical fluid; (iv) the concentration of undesirable constituents in the flue gas is much higher, making separation easier within the process; (v) most of the flue gas impurities (e.g., water and acid gaseous) are condensable which makes compression by separation and cooling possible; (vi) heat of compression can be captured and reused rather than lost in the flue gas; and (vii) because the amount of nitrogen contained in the combustion air is either greatly reduced and/or eliminated, nitrogen oxide production is greatly reduced and/or eliminated.

Economically speaking oxy-combustion costs more than traditional air-fired combustion. This is because oxy-combustion relies on decreasing the amount of nitrogen in the combustion air via various techniques thereby resulting in an increase in the percentage of oxygen present or available in the combustion air. The oxygen separation process requires a significant amount of energy leading to an increase in cost that is justified by the savings realized in the flue gas treatment plant (CPU). For example, cryogenic air separation can consume on the order of 15 percent of the electricity produced by a fossil, or carbonaceous, fuel-fired power station. However, various new technologies such as membranes and chemical looping are being developed that can be used to reduce this cost.

In the realm of coal power, oxy-combustion has the possibility to achieve a near-zero emission coal power plant, including $CO_2$. To capture $CO_2$, there is one pre-combustion method known as Integrated Gasification Combined Cycle (IGCC) and two post-combustion-based technology paths: oxy-combustion (as described above) and $CO_2$ scrubbing. Oxy-combustion is applied to the entire plant process, inherently providing near-zero emissions. $CO_2$ scrubbing can be applied to all or part of the plant emissions.

To understand how such low emission levels are achievable, consider the process schematic in FIG. 1 depicting typical combustion versus oxy-coal combustion. The oxidant for typical combustion is primarily atmospheric air which contains slight more than 78 percent by volume nitrogen and slight less than 21 percent by volume oxygen. This leads to flue gases that typically contain about 68 to about 73 percent nitrogen, about 13 to about 16 percent carbon dioxide, about 5 to about 10 percent water vapor, plus some oxygen and other minor compounds (as measured after flue gas desulfurization has taken place). On the other hand, the oxidant for oxy-combustion is nearly pure oxygen containing around 95 percent or greater oxygen with the remainder being some nitrogen and some argon. To replace the gas volume produced by the nitrogen in typical combustion using air, flue gas is recycled to the boiler. This in turn leads to flue gases being supplied to the compression purification unit (CPU) containing about 70 percent by volume or more carbon dioxide, with the remainder being primarily water, argon, nitrogen and oxygen. Thus, as can be seen from FIG. 1, combustion air is replaced with oxygen from an air separation unit (ASU). Nitrogen that would normally be conveyed with the air through conventional air-fuel firing is essentially excluded. Instead, in this exemplary set-up, a portion of the $CO_2$-rich flue gas is returned back to a conventional pulverizer/burner system, substituting recycled flue gas (primarily $CO_2$) for the nitrogen in the furnace. The $CO_2$ in oxy-combustion impacts furnace operation and heat transfer in ways similar to the nitrogen in an air-fired system. These features allow the technology to be used in retrofit and repowering applications. Oxy-combustion creates a flue gas that is primarily $CO_2$, rather than nitrogen, and includes other products of combustion (although a greatly reduced amount of $NO_x$). The fraction of the flue gas that is not recirculated to the boiler is sent to a compression purification unit (CPU).

The flue gas leaving the boiler is cleaned using conventional particulate and sulfur removal systems is known to those of skill in the art. Remaining particulate is further filtered in the CPU to protect the compressor systems. Primary and polishing scrubbers are used to reduce sulfur and moisture to required levels in the flue gas prior to recycling of a portion of the flue gas to the boiler and sending the remainder to the CPU. The trace amount of $SO_2$ remaining is removed in the CPU. A $NO_x$ removal system (such as an SCR or SNCR) is not required as the remaining combustion-generated $NO_x$ is almost completely removed as a condensable in the CPU. Mercury is removed in one or more of the scrubbers and/or CPU. To provide pipeline quality $CO_2$ at the exit of the CPU, a small amount of inert constituents must be removed in the CPU. Small quantities of oxygen, nitrogen and argon present in the oxygen from the ASU (typically 95 percent by volume pure oxygen) and from air in-leakage are vented to the atmosphere, along with a very small amount of some remaining combustion products such as carbon monoxide (CO).

In light of the above, various new emissions issues have arisen in connection with oxy-combustion. For example, various constituents present in the flue gas from oxy-combustion will lead to the generation of various liquid-based acidic compounds when the flue gas is subjected to, for example, compression. For example, a wide range of proposed oxy-combustion processes utilize compression (e.g., wet compression) of the flue gas as a step in rendering the carbon dioxide present in the flue gas suitable for storage (or reuse). During the process of compressing the wet flue gas within the CPU one or more liquid-based acidic compounds are, or will be, generated and will have to be treated and/or disposed of. Additionally, other liquid-based acidic compounds that require treatment can be generated during other phases of oxy-combustion such as water scrubbing, cooling, various adsorption and regeneration processes, etc. In the past such waste streams have been treated in a separate waste treatment process and/or system.

Given the above, a need exists in the art for a method and/or system by which to treat and/or control the liquid-based acidic compounds generated during the various post-combustion stages of an oxy-combustion process without the need for a separate waste treatment process and/or system.

SUMMARY OF THE INVENTION

The present invention relates generally to the field of emissions control and, in particular to a new and useful method and/or system by which to control, treat and/or mitigate various liquid-based acidic compounds that are produced during one or more post-combustion phases, or post-combustion processes, of oxy-combustion (e.g., during a compression step and/or cooling step) from various gaseous acid compounds and/or gaseous acid precursor compounds (e.g., $SO_x$, $NO_x$, etc.). In one embodiment, the present invention relates to a method and/or system by which such one or more liquid-based acid compounds are recycled into the flue gases and/or into one or more of the emissions control and/or flue gas treatment equipment of an oxy-combustion power generation system.

Accordingly, one aspect of the present invention is drawn to a method for treating one or more acidic compounds generated during an oxy-combustion process, the method comprising the steps of: (i) generating a flue gas stream as a result of the oxy-combustion of at least one carbonaceous fuel, wherein the flue gas stream contains at least one type of gaseous acid compound and/or gaseous acid precursor compound; (ii) treating the flue gas stream to remove at least a portion of at least one gaseous acid compound and/or gaseous acid precursor compound present therein via the use of at least one flue gas treatment device; (iii) subjecting at least a portion of the flue gas stream from Step (ii) to at least one compression step and/or cooling step so as to remove at least one additional gaseous acid compound and/or gaseous acid precursor compound present therein, wherein the compression step and/or cooling step yields a liquid-based acidic waste stream generated as a result of the removal of the at least one additional gaseous acid compound and/or gaseous acid precursor compound and an acid-depleted, or acid-lean, flue gas stream; (iv) recycling at least a portion of the liquid-based acidic waste stream to the at least one flue gas treatment device of Step (ii) for treatment, or neutralization, therein; and (v) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere.

In yet another aspect of the present invention, there is provided a method for treating one or more acidic compounds generated during an oxy-combustion process, the method comprising the steps of: (a) generating a flue gas stream as a result of the oxy-combustion of at least one carbonaceous fuel, wherein the flue gas stream contains at least one type of gaseous acid compound and/or gaseous acid precursor compound; (b) treating the flue gas stream to remove at least a portion of at least one gaseous acid compound and/or gaseous acid precursor compound present therein via the use of at least one flue gas treatment device; (c) subjecting at least a portion of the flue gas stream from Step (b) to at least one compression step and/or cooling step so as to remove at least one additional gaseous acid compound and/or gaseous acid precursor compound, present therein, wherein the compression step and/or cooling step yields a liquid-based acidic waste stream generated as a result of the removal of the at least one additional gaseous acid compound and/or gaseous acid precursor compound and an acid-depleted, or acid-lean, flue gas stream; (d) recycling at least a portion of the liquid-based acidic waste stream to the at least one flue gas treatment device of Step (b) for treatment, or neutralization, therein; (e) subjecting the acid-depleted, or acid-lean, flue gas stream to at least one additional emissions control and/or flue gas treatment technology; and (f) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere.

In yet another aspect of the present invention, there is provided a method for treating one or more acidic compounds generated during an oxy-combustion process, the method comprising the steps of: (I) generating a flue gas stream as a result of the oxy-combustion of at least one carbonaceous fuel, wherein the flue gas stream contains at least one type of gaseous acid compound and/or gaseous acid precursor compound; (II) treating the flue gas stream to remove at least a portion of at least one gaseous acid compound and/or gaseous acid precursor compound present therein via the use of at least one flue gas treatment device; (III) subjecting the flue gas stream from Step (II) to at least one compression step and/or cooling step so as to remove at least one additional gaseous acid compound and/or gaseous acid precursor compound present therein, wherein the compression step and/or cooling step yields a liquid-based acidic waste stream generated as a result of the removal of the at least one gaseous acid compound and/or gaseous acid precursor compound and an acid-depleted, or acid-lean, flue gas stream; (IV) recycling at least a portion of the liquid-based acidic waste stream to the at least one flue gas treatment device of Step (II) for treatment, or neutralization, therein; (V) subjecting the acid-depleted, or acid-lean, flue gas stream to at least one additional emissions control and/or flue gas treatment technology; and (VI) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere, wherein the liquid-based acidic waste stream is split into at least two liquid-based acidic waste streams, a portion of each split liquid-based waste stream then being subjected to recycling in the at least one flue gas treatment device of Step (II) for treatment, or neutralization, therein.

In yet another aspect of the present invention, there is provided a method for oxy-combustion as shown and described herein, the method including the step of recycling at least one liquid-based acidic waste stream generated during some portion of the overall oxy-combustion process for treatment in the oxy-combustion process.

In yet another aspect of the present invention, there is provided a system for oxy-combustion as shown and described herein, the system including recycling at least one liquid-based acidic waste stream generated during some portion of the overall oxy-combustion process for treatment in the oxy-combustion process.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

As used herein, the term "emissions" is to be broadly construed to include both gaseous combustion emissions, as well as liquid or other emissions that are generated during various process that are used to treat, or clean, the resulting combustion flue gases. Furthermore, while the present invention will be described in terms oxy-combustion, the present invention is not limited thereto. Rather, the method and/or system of the present invention can be utilized in any situation where the need presents itself to treat and/or remove liquid-based acidic compounds that are generated from various gaseous acid wastes and/or gaseous acid precursor wastes (e.g., $SO_x$, $NO_x$, etc.) that have been subjected to condensation to yield the one or more liquid-based acid compounds and/or acidic waste water from a flue gas.

As noted above, the present invention relates generally to the field of emissions control and, in particular to a new and useful method and/or system by which to control, treat and/or mitigate various liquid-based acidic compounds that are produced during oxy-combustion (e.g., during a compression step and/or cooling step) from various gaseous acid compounds and/or gaseous acid precursor compounds (e.g., $SO_x$, $NO_x$, etc.). In one embodiment, the present invention relates to a method and/or system by which such one or more liquid-based acid compounds are recycled into the flue gases and/or into one or more of the emissions control and/or flue gas treatment equipment of an oxy-combustion power generation system.

Figure 1:
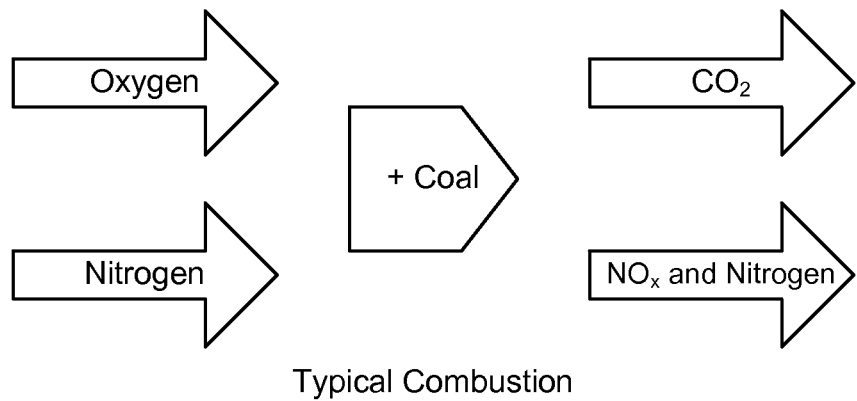
FIG. 1 is an illustration of the difference between the combustion "air" and the combustion flue gases in typical coal combustion versus oxy-coal combustion.
Figure 1:
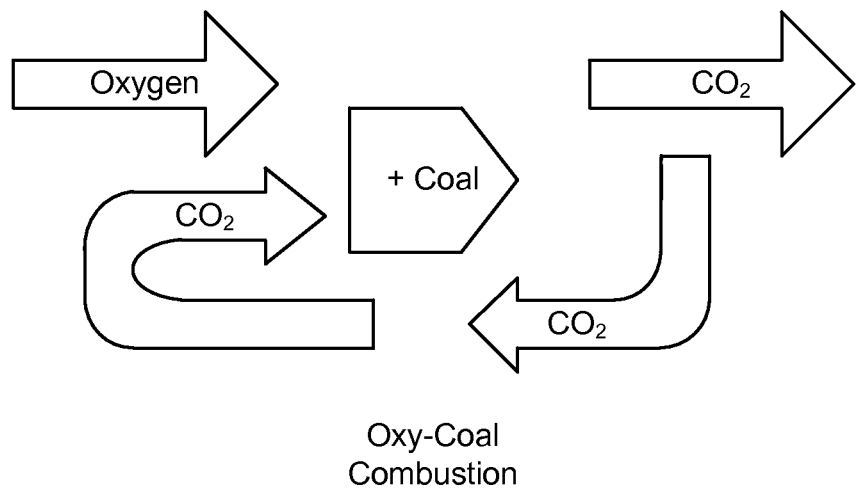
Figure 2:
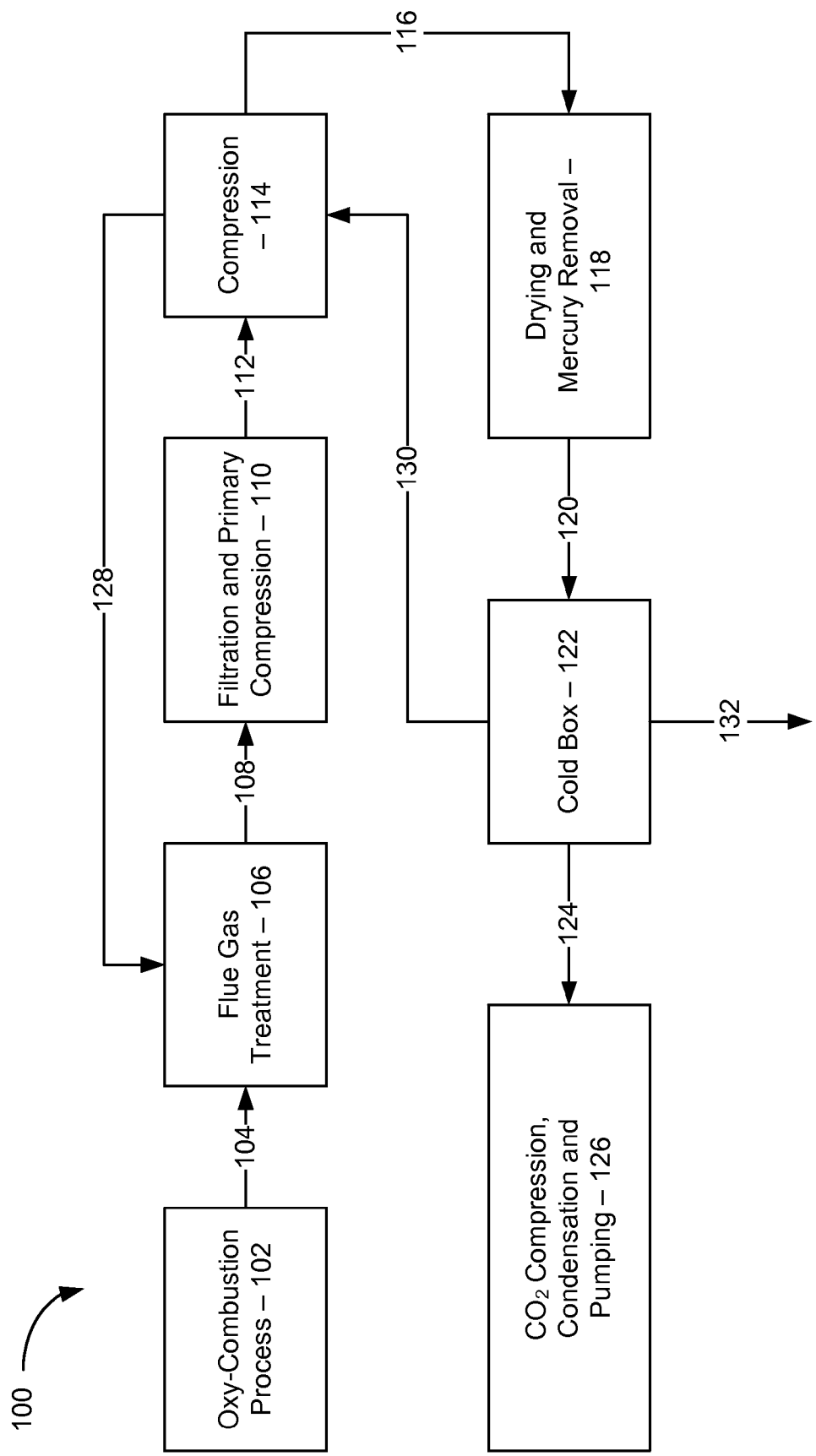
FIG. 2 is an illustration of one embodiment of a method for recycling various acidic compounds in accordance with the present invention.

Turning to FIG. 2, FIG. 2 represents one embodiment of the present invention. In the embodiment of FIG. 2, oxy-combustion system 100 of the present invention is illustrated in block diagram form. As shown in FIG. 2, system 100 of the present invention comprises at least one oxy-combustion process 102 fueled by a suitable fossil fuel. Suitable fossil fuels include, but are not limited to, oil, coal, natural gas, tar sands, bitumen, or any combination of two or more thereof. As known to those of skill in the art, oxy-combustion utilizes an oxidant, input gas, or combustion fuel gas that generally contains about 95 percent or more greater oxygen by volume. Such an oxidant, or input gas, may or may not be mixed with recycled flue gas (RFG). Depending upon the amount of recycled flue gas (RFG) mixed with the oxidant, input gas, or combustion fuel gas the mixture can contain more than 21 percent by volume oxygen with the remainder of the oxidant, or input gas, being primarily a combination of carbon dioxide and water. In one embodiment, the fossil fuel for oxy-combustion process 102 is any suitable type of coal (e.g., low sulfur coal, Powder River Basin Coal, etc.) and the carrier gas for the pulverized coal is recycled combustion flue gases from the oxy-combustion process.

In still another embodiment, the oxidant, input gas, or combustion fuel gas for oxy-combustion process 102 contains more than about 22 percent by volume oxygen, more than about 25 percent by volume oxygen, more than about 30 percent by volume oxygen, more than about 35 percent by volume oxygen, more than about 40 percent by volume oxygen, more than about 45 percent by volume oxygen, more than about 50 percent by volume oxygen, more than about 55 percent by volume oxygen, more than about 60 percent by volume oxygen, more than about 65 percent by volume oxygen, more than about 70 percent by volume oxygen, more than about 75 percent by volume oxygen, more than about 80 percent by volume oxygen, more than about 85 percent by volume oxygen, more than about 90 percent by volume oxygen, or even more than about 90 percent by volume oxygen, with the remainder of the gas stream being a primarily combination of carbon dioxide and water. Here, as well as elsewhere in the specification and claims, individual numerical values and/or range limits can be combined to form new and/or undisclosed ranges.

The flue gases produced by any suitable oxy-combustion process 102 are conveyed by flue gas ducting 104 to flue gas treatment 106 where one or more substances in the combustion flue gases are removed. As would be appreciated by those of skill in the art, flue gas ducting 104, and for that matter any flue gas ducting of the present invention, can be formed from any suitable material known to those of skill in the art. Such materials include, but are not limited to, metal ducting, metal alloy ducting, etc.

The compounds removed from the flue gas during emissions control and/or flue gas treatment can include, but are not limited to, at least one of $SO_x$ (e.g., $SO_2$, $SO_3$, etc.), $NO_x$, and/or one or more particulates. In some embodiments, as would be appreciated by those of skill in the art, the amount of $NO_x$ (e.g., $NO$, $NO_2$, $N_2O_4$, $N_2O_5$, etc.) to remove may not necessitate one or more $NO_x$ control systems as oxy-combustion processes inherently minimize $NO_x$ production to a point where, in combination with the CPU, $NO_x$ removal may not be, or is not, needed. As would be appreciated by those of skill in the art, $SO_x$ removal can be accomplished utilizing any suitable $SO_x$ removal technology. Suitable $SO_x$ removal technologies include, but are not limited to, wet flue gas desulfurization processes, dry flue gas desulfurization processes, spray-dry scrubbing processes, wet sulfuric acid processes designed to recover commercial quality sulfuric acid, SNOX flue gas desulfurization processes that are designed to remove sulfur dioxide, nitrogen oxides and particulates from flue gases, direct contact cooler-polishing scrubber (DCCPS), or a combination of any two or more thereof.

In one embodiment, any suitable particulate removal and/or collection process can be utilized to reduce and/or eliminate the amount of particulate matter in the flue gas during the flue gas treatment portion of the present invention. As would be appreciated by those of skill in the art, suitable particulate control processes include, but are not limited to, electrostatic precipitator (ESP), bag houses, or any combination thereof.

After completion of the one or more flue gas treatment processes (e.g., emissions control processes such a $SO_x$ scrubbing, particulate collection, mercury removal, etc.) in section 106 the now cleaned flue gas is delivered via flue gas duct 108 to one or more filtration and primary compression units 110. The one or more filtration and primary compression units 110 are designed to begin to treat the flue gas for eventual carbon dioxide recovery and/or capture. Alternatively, in another embodiment the one or more filtration and primary compression units 110 can eliminated and replaced by a system that pressurizes the flue gas so as to make the flue suitable for further processing to achieve eventual carbon dioxide recovery and/or capture. Thus, in one embodiment section 110 of FIG. 2 could be eliminated. After treatment of the flue gas in the one or more filtration and primary compression units 110 the so treated flue gas is conveyed by flue gas duct 112 to one or more secondary compression units 114 (e.g., wet compression units) where at least one gaseous acid compound and/or at least one gaseous acid precursor compound is/are removed from the flue gas stream. Such gaseous acid compounds and/or gaseous acid precursor compounds include, but not limited to, $SO_x$, $NO_x$, hydrogen fluoride, hydrogen chloride, hydrogen bromide, carbon dioxide, sulfur-based acids, hydrochloric acid, hydrofluoric acid, hydrobromic acid, nitric acid, carbonic acid, or mixtures of any two or more thereof, or mixtures of any three or more thereof, or mixtures of any four or more thereof, or mixtures of any five thereof, or even mixtures of any six or more thereof. Generally speaking a wet compression processes condenses water and acid compounds due to the fact that the one or more gaseous acid compounds and/or gaseous acid precursor compounds in the flue gas have a dew point, or condensation point, lower than that of carbon dioxide. Given the fact that water is present in this process, the waste stream produced thereby tends to be composed of one or more liquid-based acidic compounds including, but not limited to, one or more of nitric acid, sulfuric acid, carbonic acid, hydrochloric acid, hydrofluoric acid, hydrobromic acid, or mixtures of any two or more thereof, or mixtures of any three or more thereof, or mixtures of any four or more thereof, or mixtures of any five or more thereof, or even mixtures of any six or more thereof. The pH of the waste stream from the one or more exemplary wet compression units 114 is between about −1 to about 3.5, or from about −0.5 to about 3, or even from about 0 to about 3. Here, as well as elsewhere in the specification and claims, individual numerical values and/or range limits can be combined to form new and/or undisclosed ranges.

In the one or more exemplary wet compression units 114 at least about 25 percent by weight of each of the individual one or more gaseous acid compounds and/or one or more gaseous acid precursor compounds present in the flue gas stream are removed from the flue gas stream. In another embodiment, at least about 30 percent by weight, at least about 40 percent by weight, or at least about 50 percent by weight, or at least about 60 percent by weight, or at least about 70 percent by weight, or at least about 75 percent by weight, or at least about 80 percent by weight, or at least about 85 percent by weight, or at least about 90 percent by weight, or at least about 95 percent by weight, or even at least about 98 percent by weight or more of the one or more gaseous acid compounds and/or one or more gaseous acid precursor compounds present in the flue gas stream are removed from the flue gas stream. As noted above, the removal level for each individual gaseous acid compound and/or gaseous acid precursor compound can, in one instance, vary independently from any one or more other gaseous acid compounds and/or one or more gaseous acid precursor compounds present in the flue gas stream. In another embodiment, the removal level for all of the gaseous acid compounds, or one or more gaseous acid precursor compounds, present in the flue gas stream is approximately the same. Here, as well as elsewhere in the specification and claims, individual numerical values and/or range limits can be combined to form new and/or undisclosed ranges. In still another embodiment, all, or 100 percent, of any gaseous acid compounds and/or gaseous acid precursor compounds are removed from the flue gas stream during the wet compression process.

Due to the presence of water in the wet compression process conducted in the one or more wet compression units 114, at least one liquid-based acidic waste, or acidic waste, stream is generated. Previously such waste stream had to be sent to waste water treatment where the acidic nature of the waste stream from the one or more wet compression units 114 was neutralized utilizing any one of a number of waste water treatment processes known to those of skill in the art. However, the present invention is advantageous in that it permits recycling of the acidic waste stream from the one or more wet compression units 114 via conduit, pipe, or other transport media 128 to any one or more basic flue gas treatment processes that are present. As would be apparent to those of skill in the art, conduit 128 is not limited to any one structure. Rather, any suitable structure, or method of transport, can be utilized so long as such structure, or method of transport, is designed to safely and economically transport an acidic waste stream, a liquid-based acidic waste stream and/or a highly acidic liquid-based waste. It should be noted that, in the specification and claims, the terms acidic waste stream, liquid-based acidic waste stream and/or highly acidic liquid-based waste are used interchangeably even though such terms have slightly different meanings.

In one embodiment, conduit/pipe 128 supplies at least a portion of the liquid-based acidic waste stream to at least one of the $SO_x$ scrubbers upstream in emissions control section 106. In one embodiment, at least about 25 percent by weight of the acidic waste stream from the one or more compression units 114 is/are treated in the one or more $SO_x$ scrubbers of emissions control section 106. In another embodiment, at least about 30 percent by weight, at least about 40 percent by weight, at least about 50 percent by weight, or at least about 60 percent by weight, or at least about 70 percent by weight, or at least about 75 percent by weight, or at least about 80 percent by weight, or at least about 85 percent by weight, or at least about 90 percent by weight, or at least about 95 percent by weight, or even at least about 98 percent by weight or more of the acidic waste stream from the one or more compression units 114 is/are treated in the one or more $SO_x$ scrubbers of emissions control section 106. As noted above, the pH range of the acidic waste stream in conduit/pipe 128 is in the range of about −1 to about 3.5, or from about −0.5 to about 3, or even from about 0 to about 3. Here, as well as elsewhere in the specification and claims, individual numerical values and/or range limits can be combined to form new and/or undisclosed ranges. Depending upon the pH of the acidic waste stream contained in conduit/pipe 128 the amount of material utilized in the one or more $SO_x$ scrubbers of emissions control section 106 may have to be increased. For example, the amount of limestone, lime, sodium bicarbonate, or other alkaline reagent that is used to neutralize $SO_x$ in the one or more scrubbers of emissions control section 106 may have to be increased in order to achieve the desired neutralization of the acidic waste stream that is recycled to the one or more $SO_x$ scrubbers via conduit/pipe 128. It should be noted that the present invention is not limited to any one specific alkaline reagent, or type of $SO_x$ scrubber. Rather, an acidic waste stream from the one or more compression units 114 (e.g., wet compression units) can be supplied to any suitable type of $SO_x$ scrubber in emissions control section 106 so long as such scrubbers are capable of being designed to handle an increased acidic load in the form of a liquid-based and/or gas-based acidic material.

Turning to the remainder of FIG. 2, after the one or more compression units 114 are done removing the one or more acidic compounds from the flue gas stream generated in the oxy-combustion process 102, the flue gas is then conveyed via flue gas duct 116 to drying and mercury removal stage 118 where any mercury present in the flue gas is removed via any suitable mercury capture technique. Suitable mercury capture techniques include, but are not limited to, mercury oxidation capture techniques using one or more halogen gases and/or halogen compounds, capture using one or more mercury sorbents (e.g., powdered activated carbon or brominated powdered activated carbon), mercury oxidation techniques (e.g., SCRs, mercury oxidation by either a mercury oxidation catalyst compound and/or one or more mercury oxidation compounds), etc. After completion of the mercury capture and drying process, the flue gas stream is the provided to cold box section 122 via flue gas duct 120.

During treatment in cold box section 122, the bulk of the carbon dioxide in the flue gas stream is separated from the other gaseous components present in the flue gas stream by condensation to liquid form. Other gaseous components at this stage include, but are not limited to, argon gas, oxygen gas, nitrogen gas, or mixtures of any two or more thereof. The bulk of the carbon dioxide in the flue gas stream prior to entry into cold box section 122 is then converted into suitable state for carbon transport and use or sequestration. Regarding the amount of carbon dioxide removed from flue gas stream in cold box section 122 of carbon capture, the amount of the carbon dioxide removed is at least about 50 percent by weight of the total carbon dioxide present in the flue gas stream prior to entry into cold box section 122. In another embodiment, the amount of carbon dioxide that is removed for later sequestration or industrial usage is at least about 60 percent by weight, or at least about 70 percent by weight, or at least about 80 percent by weight, or at least about 85 percent by weight, or at least about 90 percent by weight, or at least about 95 percent by weight, or at least about 98 percent by weight or more the total carbon dioxide present in the flue gas stream prior to entry into cold box section 122. Here, as well as elsewhere in the specification and claims, individual numerical values and/or range limits can be combined to form new and/or undisclosed ranges.

Next, the liquid carbon dioxide is pumped, further condensed, and/or pressurized in the carbon dioxide compression, condensation and pumping section 126 (also known as a compression purification unit (CPU)) so that the carbon dioxide is ready for transport, use, and/or sequestration. The remaining non-condensable gases are sent to a vent. As noted above, at this point the gas supplied to section 126 is highly enriched with carbon dioxide and contain little to no acid gases, nitrogen, oxygen argon, air, etc. In one embodiment, the gas supplied to section 126 is at least about 80 percent by weight carbon dioxide, at least about 85 percent by weight carbon dioxide, at least about 90 percent by weight carbon dioxide, at least about 95 percent by weight carbon dioxide, or at least about 98 percent by weight carbon dioxide, or even 100 percent carbon dioxide. Here, as well as elsewhere in the specification and claims, individual numerical values and/or range limits can be combined to form new and/or undisclosed ranges.

The remaining non-condensable flue gases from cold box section 122 are then transported via flue gas duct 132 and further processed as need be and released to the atmosphere via any suitable method. It should be noted that due to the amount of material removed prior to emission of the remainder of the flue gas stream out of the "stack" at least about 50 percent by volume of the flue gas stream created by the oxy-combustion process is captured and removed prior to any flue gas emissions to the outside atmosphere. In another embodiment, at least about 60 percent by volume, at least about 70 percent by volume, at least about 75 percent by volume, at least about 80 percent by volume, or at least about 85 percent by volume or more of the original flue gas stream is removed prior to emission of any flue gas to the outside atmosphere. Here, as well as elsewhere in the specification and claims, individual numerical values and/or range limits can be combined to form new and/or undisclosed ranges.

In another embodiment, any remaining gaseous acid compounds and/or gaseous acid precursor compounds in the flue gas stream, or gas stream, present after treatment in sections 106, 110, 114 and 118 of system 100 may be removed in cold box section 122 and sent, in either gas or liquid form, via flue, or conduit/pipe, 130 back to compression section 114 for removal and conversion to a liquid-based acidic waste stream. If in gaseous form, this acidic waste stream can then be converted into liquid form and sent via conduit/pipe 128 to at least one of the $SO_x$ scrubbers upstream in flue gas treatment section 106, as described in detail above.

As would be apparent to those of skill in the art oxy-combustion system 100 of FIG. 2 can have additional conventional sections and/or conventional components that are not specifically illustrated therein. For example, system 100 will have at least one air separation unit to supply oxygen to the combustion process so that such combustion process can be considered oxy-combustion.

Regarding system 100, it should be noted that the recycling of the acid wastes generated by such process typically do not occur until after oxy-combustion has been achieved. As is known to those of skill in the art, during start-up the combustion process may not be considered oxy-combustion. This is because the oxy-combustion process can be started using air and transitioned to oxy-combustion thereafter. In this case it takes some time to generate sufficient flue gas to be recycled in order to displace the air in the combustion process with nearly pure oxygen so as to eliminate the nitrogen and other components of ambient air, thereby achieving continuous oxy-combustion. Accordingly, in one embodiment prior to achieving steady-state oxy-combustion, the liquid-based acid waste stream generated by compression section 114 may be so small, or non-existent, that recycling to the one or more scrubbers of section 106 is either impractical, impossible or unnecessary. In another embodiment, if so desired recycling of any liquid-based acid waste stream from compression section 114 can be recycled to the one or more scrubbers of section 106 regardless of the type of the combustion occurring upstream.

Figure 3:
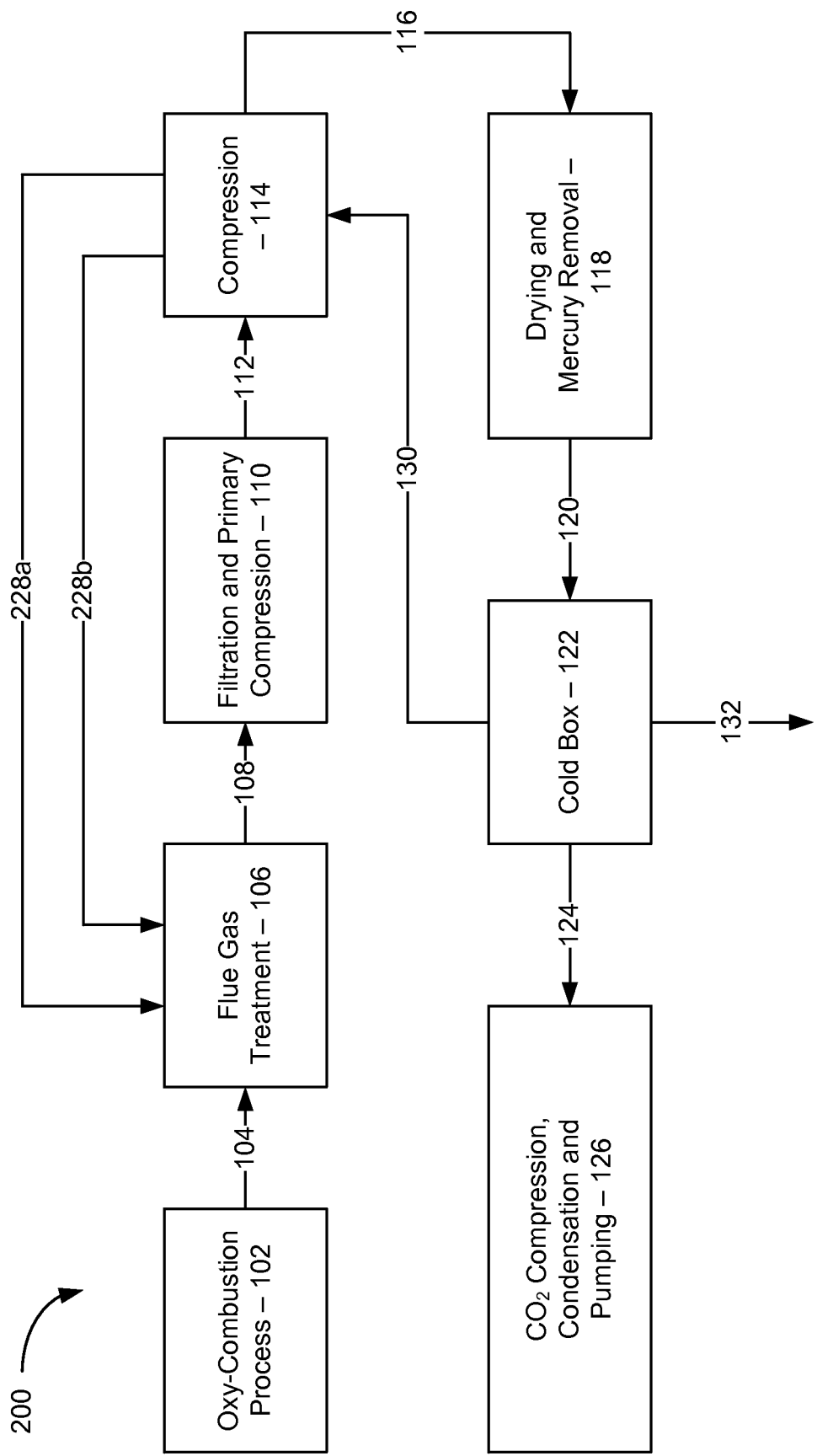
FIG. 3 is an illustration of another embodiment of a method for recycling various acidic compounds in accordance with the present invention.

Turning to FIG. 3, FIG. 3 illustrates an alternative embodiment that is identical to that of FIG. 2 except that waste stream 128 is split into two or more discrete waste streams 228a and 228b. Although only two individual supply conduits/pipes 228a and 228b are shown in FIG. 3, the present invention is not limited thereto. Rather, any desired number of split streams numbering more than two can be utilized in conjunction with the embodiment of FIG. 3. As is illustrated in FIG. 3, system 200 contains two waste streams 228a and 228b from compression section 114 that are individually supplied and/or recycled back to flue gas treatment section 106. In one instance, the liquid-based acidic waste stream generated by compression section 114 can be split into two or more similar waste streams 228a and 228b the nature of each as far as pH is concerned is approximately similar. On the other hand, if the liquid-based acidic waste stream generated by compression section 114 is split into two or more dissimilar waste streams 228a and 228b, one portion 228a thereof can be a highly acidic portion and the other portion 228b thereof can be a lower acidic portion. One non-limiting example of a split waste stream scenario where the pH of each portion of the split waste stream differs is where the liquid-based acidic waste stream generated by compression section 114 is split into a highly acidic waste stream portion having a pH of less than about 1, less than about 0, or even a pH of about −1. In this embodiment, the other portion of the split liquid-based acidic waste stream generated by compression section 114 contains a significant amount of water and has a pH of at least about 3, at least about 4, at least about 5, or even at least about 6.

Figure 4:
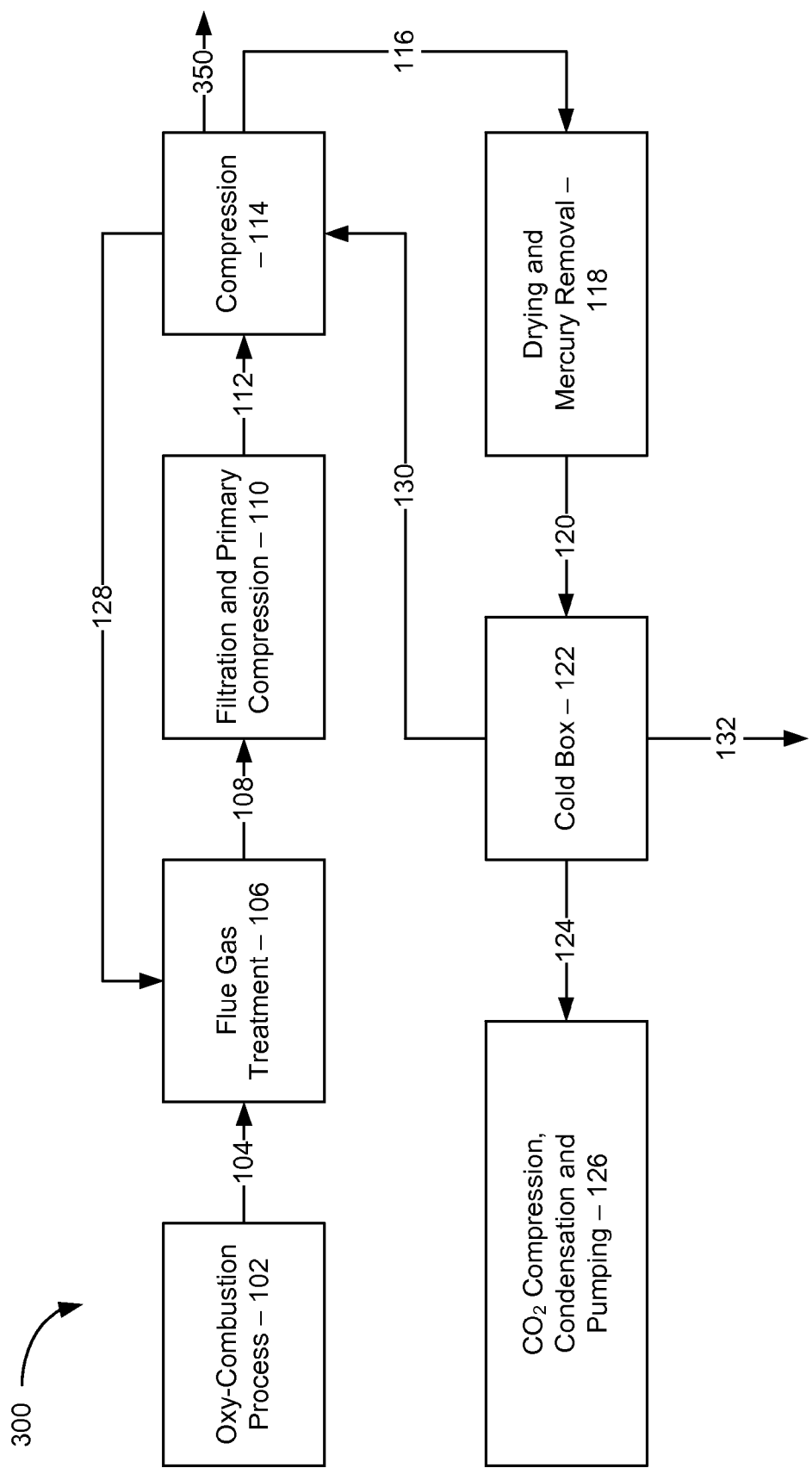
FIG. 4 is an illustration of still another embodiment of a method for recycling various acidic compounds in accordance with the present invention.

Turning to FIG. 4, FIG. 4 illustrates an alternative embodiment that is identical to that of FIG. 2 except that a by-pass conduit and/or pipe 350 is supplied from compression section 114 so that any excess acidic waste stream can be sent to a suitable waste water treatment process. As is illustrated in FIG. 4, system 300 contains conduit/pipe 350 is utilized to handle any amount of the acidic waste stream that is in excess of the amount that can be handled, treated and/or neutralized by the various emissions control and/or flue gas treatment devices of flue gas treatment section 106.

Figure 5:
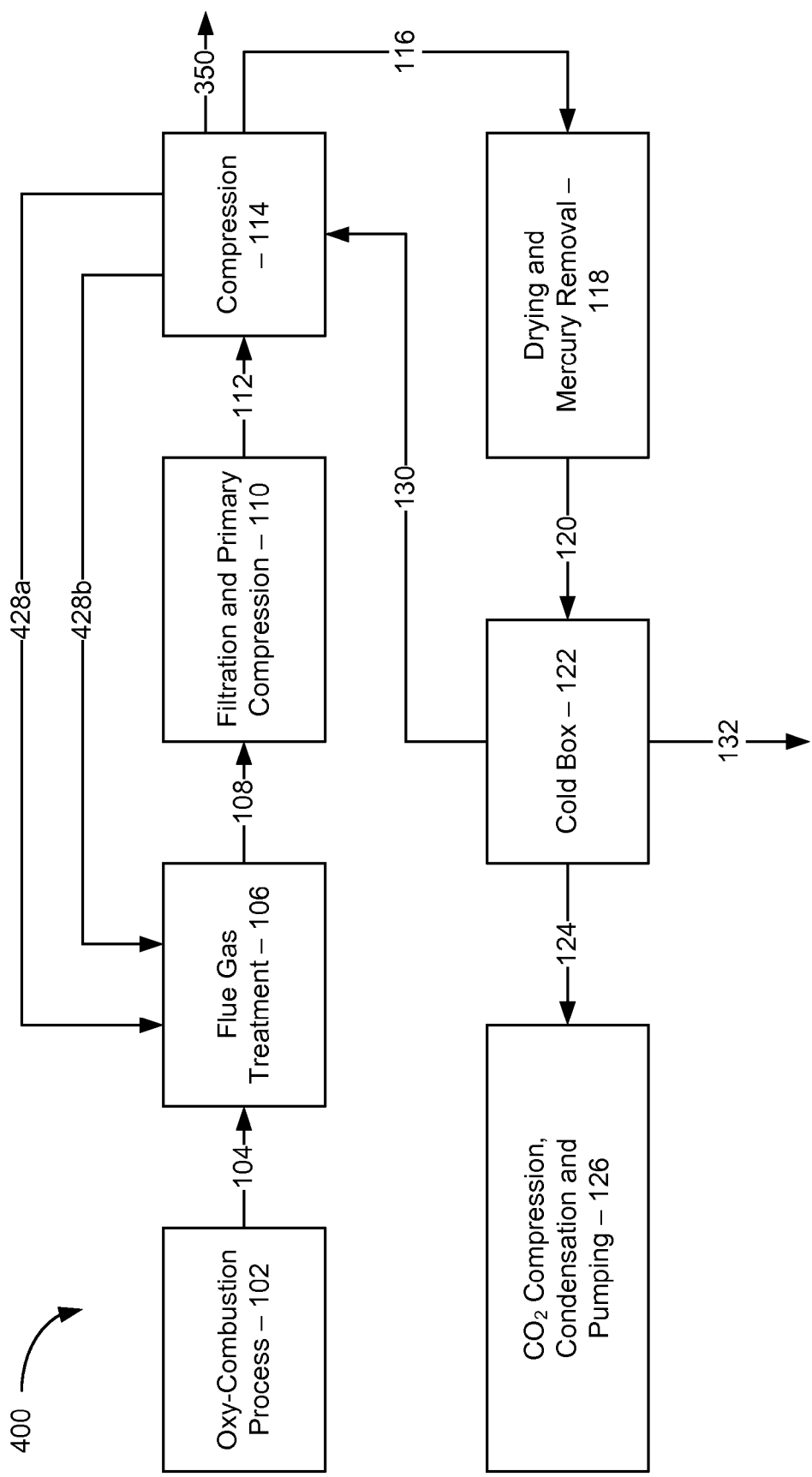
FIG. 5 is an illustration of the still another embodiment of a method for recycling various acidic compounds in accordance with the present invention.

Turning to FIG. 5, FIG. 5 illustrates an alternative embodiment that is identical to that of FIG. 4 except that waste stream 128 is split into two or more discrete waste streams 428a and 428b. Although only two individual supply conduits/pipes 428a and 428b are shown in FIG. 5, the present invention is not limited thereto. Rather, any desired number of split streams numbering more than two can be utilized in conjunction with the embodiment of FIG. 5. As is illustrated in FIG. 3, system 400 contains two waste streams 428a and 428b from compression section 114 that are individually supplied and/or recycled back to flue gas treatment section 106. In one instance, the liquid-based acidic waste stream generated by compression section 114 can be split into two or more similar waste streams 428a and 428b the nature of each as far as pH is concerned is approximately similar. On the other hand, if the liquid-based acidic waste stream generated by compression section 114 is split into two or more dissimilar waste streams 428a and 428b, one portion 428a thereof can be a highly acidic portion and the other portion 428b thereof can be a lower acidic portion. One non-limiting example of a split waste stream scenario where the pH of each portion of the split waste stream differs is where the liquid-based acidic waste stream generated by compression section 114 is split into a highly acidic waste stream portion having a pH of less than about 1, less than about 0, or even a pH of about −1. In this embodiment, the other portion of the split liquid-based acidic waste stream generated by compression section 114 contains a significant amount of water and has a pH of at least about 3, at least about 4, at least about 5, or even at least about 6. Here, as well as elsewhere in the specification and claims, individual numerical values and/or range limits can be combined to form new and/or undisclosed ranges. As is illustrated in FIG. 5, system 400 also contains conduit/pipe 350 that, as is described above with regard to the embodiment of FIG. 3, is utilized to handle any amount of the acidic waste stream that is in excess of the amount that can be handled, treated and/or neutralized by the various emissions control and/or flue gas treatment devices of flue gas treatment section 106.

Regarding the various embodiments of the present invention as represented in FIGS. 2 through 5, in one embodiment it may be necessary to modify one or more components of the one or more $SO_x$ scrubbers in order to achieve and/or maintain the necessary stoichiometric ratio of the one or more alkaline reagent to the multiple acidic waste compounds and/or acidic waste streams that are being subjected to treatment and/or neutralization therein. For example, it may be necessary to increase the amount of the one or more alkaline reagents being supplied to the one or more $SO_x$ scrubbers by increasing the size and/or capacity of the reagent pump in any one or more of the $SO_x$ scrubbers that are being utilized to treat both $SO_x$ as well as recycled acid waste stream from at least the compression section 114 of an oxy-combustion power plant.

EXAMPLE

The following example is non-limiting in nature and is based upon the flue gas stream that would be generated by a 700 MWe oxy-combustion power plant that is being fueled with low sulfur coal (e.g., Powder River Basin coal) and utilizing low $NO_x$ burners. The composition of the flue gas will be given referencing various components therein and using reference points based on various portions of the embodiment of FIG. 2. The composition of the flue gas in flue gas duct 108 as it proceeds from flue gas treatment section 106 to filtration and primary compression section 110 is about 817 ppm by weight $NO_x$, 1 ppm by volume $SO_2$, 87.25 percent by weight carbon dioxide, 1.3 percent by weight water vapor, 3.17 percent by weight oxygen ($O_2$), 5.08 percent by weight nitrogen ($N_2$), 3.2 percent by weight argon gas, and a flow rate of 1342.9 klb/h. The composition of the flue gas in flue gas duct 112 as it proceeds from filtration and primary compression section 110 to secondary compression section 114 is 87.25 percent by weight carbon dioxide, 1.3 percent by weight water vapor, 3.17 percent by weight oxygen ($O_2$), 5.08 percent by weight nitrogen ($N_2$), 3.2 percent by weight argon gas, and a flow rate of 1342.9 klb/h. The composition of the flue gas in flue gas duct 116 as it proceeds from compression section 114 to drying and mercury removal section 118 is 87.89 percent by weight carbon dioxide, 0.05 percent by weight water vapor, 3.34 percent by weight oxygen ($O_2$), 5.21 percent by weight nitrogen ($N_2$), 3.51 percent by weight argon gas, and a flow rate of 1387.9 klb/h. The composition of the flue gas in flue gas duct 120 as it proceeds from drying and mercury removal section 118 to cold box section 122 is 87.93 percent by weight carbon dioxide, essentially zero percent by weight water vapor, 3.34 percent by weight oxygen ($O_2$), 5.21 percent by weight nitrogen ($N_2$), 3.51 percent by weight argon gas, and a flow rate of 1387.2 klb/h. The composition of the flue gas in flue gas duct 124 as it proceeds from cold box section 122 to $CO_2$ compression, condensation and pumping section 126 is 100 percent by weight carbon dioxide, zero percent by weight water vapor, zero percent by weight oxygen ($O_2$), zero percent by weight nitrogen ($N_2$), zero percent by weight argon gas, and a flow rate of 1052.7 klb/h. When in gaseous form, the composition of the flue gas in flue gas duct 130 as it proceeds from cold box section 122 to condensing in compression section 114 is 77.86 percent by weight carbon dioxide, essentially zero percent by weight water vapor, 6.18 percent by weight oxygen ($O_2$), 6.61 percent by weight nitrogen ($N_2$), 9.35 percent by weight argon gas, and a flow rate of 61.7 klb/h. The composition of the flue gas in flue gas duct 132 as it proceeds from cold box section 122 to further processing and eventual atmospheric release is 43.62 percent by weight carbon dioxide, essentially zero percent by weight water vapor, 15.61 percent by weight oxygen ($O_2$), 25.01 percent by weight nitrogen ($N_2$), 15.76 percent by weight argon gas, and a flow rate of 272.7 klb/h. In the case of this example, as well as that of the various embodiments of the present invention, the overall amount of the combustion flue gases that is both water and acidic compounds is in the range of about 1 percent by weight to 8 percent by weight, or from about 2 percent by weight to about 7 percent by weight, or from about 3 percent by weight to about 6 percent by weight, or even from about 4 percent by weight to about 5 percent by weight. In still another embodiment, the overall amount of the combustion flue gases that is both water and acidic compounds is in the range of about 5 percent by weight to 7.5 percent by weight. Here, as well as elsewhere in the specification and claims, individual numerical values and/or range limits can be combined to form new and/or undisclosed ranges.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for treating one or more acidic compounds generated during an oxy-combustion process, the method comprising the steps of:
   (i) generating a flue gas stream as a result of the oxy-combustion of at least one carbonaceous fuel, wherein the flue gas stream contains at least one type of gaseous acid compound and/or gaseous acid precursor compound;
   (ii) treating the flue gas stream to remove at least a portion of at least one gaseous acid compound and/or gaseous acid precursor compound present therein via the use of at least one flue gas treatment device;
   (iii) subjecting at least a portion of the flue gas stream from Step (ii) to at least one compression step and/or cooling step so as to remove at least one additional gaseous acid compound and/or gaseous acid precursor compound present therein, wherein the compression step and/or cooling step yields a liquid-based acidic waste stream generated as a result of the removal of the at least one additional gaseous acid compound and/or gaseous acid precursor compound and an acid-depleted, or acid-lean, flue gas stream;
   (iv) recycling at least a portion of the liquid-based acidic waste stream to the at least one flue gas treatment device of Step (ii) for treatment, or neutralization, therein; and
   (v) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere.

2. The method of claim 1, wherein the oxy-combustion process is a coal-based oxy combustion process.

3. The method of claim 1, wherein the oxy-combustion process is a low sulfur coal-based oxy-combustion process.

4. The method of claim 1, wherein Step (ii) comprises removing $SO_x$ via one or more devices selected from wet flue gas desulfurization processes, dry flue gas desulfurization processes, spray-dry scrubbing processes, wet sulfuric acid processes designed to recover commercial quality sulfuric acid, SNOX flue gas desulfurization processes that are designed to remove sulfur dioxide, nitrogen oxides and particulates from flue gases, direct contact cooler-polishing scrubber processes, or a combination of any two or more thereof.

5. The method of claim 1, wherein the pH of the liquid-based acidic waste stream is between about −1 to about 3.5.

6. The method of claim 1, wherein the amount of the one or more additional gaseous acid compounds and/or gaseous acid precursor compounds removed in Step (iii) is at least about 50 percent by weight of the total amount of the one or more gaseous acid compounds and/or gaseous acid precursor compounds present in the flue gas stream prior to Step (iii).

7. The method of claim 1, wherein the at least one additional gaseous acid compound and/or gaseous acid precursor compound removed in Step (iii) is selected from $SO_x$, $NO_x$, hydrogen fluoride, hydrogen chloride, hydrogen bromide, carbon dioxide, sulfur-based acids, hydrochloric acid, hydrofluoric acid, hydrobromic acid, nitric acid, carbonic acid, or mixtures of any two or more thereof.

8. The method of claim 1, wherein Step (iv) involves recycling at least 50 percent by weight of the liquid-based acidic waste stream from Step (iii) to the at least one flue gas treatment device of Step (ii) for treatment, or neutralization, therein.

9. The method of claim 1, wherein Step (iv) involves recycling at least 90 percent by weight of the liquid-based acidic waste stream from Step (iii) to the at least one flue gas treatment device of Step (ii) for treatment, or neutralization, therein.

10. The method of claim 1, wherein the method further comprises send the remaining portion of the liquid-based acidic waste stream from Step (iii) to at least one waste water treatment process via at least one by-pass, or overflow, line.

11. A method for treating one or more acidic compounds generated during an oxy-combustion process, the method comprising the steps of:
(a) generating a flue gas stream as a result of the oxy-combustion of at least one carbonaceous fuel, wherein the flue gas stream contains at least one type of gaseous acid compound and/or gaseous acid precursor compound;
(b) treating the flue gas stream to remove at least a portion of at least one gaseous acid compound and/or gaseous acid precursor compound present therein via the use of at least one flue gas treatment device;
(c) subjecting at least a portion of the flue gas stream from Step (b) to at least one compression step and/or cooling step so as to remove at least one additional gaseous acid compound and/or gaseous acid precursor compound, present therein, wherein the compression step and/or cooling step yields a liquid-based acidic waste stream generated as a result of the removal of the at least one additional gaseous acid compound and/or gaseous acid precursor compound and an acid-depleted, or acid-lean, flue gas stream;
(d) recycling at least a portion of the liquid-based acidic waste stream to the at least one flue gas treatment device of Step (b) for treatment, or neutralization, therein;
(e) subjecting the acid-depleted, or acid-lean, flue gas stream to at least one additional emissions control and/or flue gas treatment technology; and
(f) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere.

12. The method of claim 11, wherein the oxy-combustion process is a coal-based oxy combustion process.

13. The method of claim 11, wherein the oxy-combustion process is a low sulfur coal-based oxy-combustion process.

14. The method of claim 11, wherein Step (b) comprises removing $SO_x$ via one or more devices selected from wet flue gas desulfurization processes, dry flue gas desulfurization processes, spray-dry scrubbing processes, wet sulfuric acid processes designed to recover commercial quality sulfuric acid, SNOX flue gas desulfurization processes that are designed to remove sulfur dioxide, nitrogen oxides and particulates from flue gases, direct contact cooler-polishing scrubber processes, or a combination of any two or more thereof.

15. The method of claim 11, wherein the pH of the liquid-based acidic waste stream is between about −1 to about 3.5.

16. The method of claim 11, wherein the amount of the one or more additional gaseous acid compound and/or gaseous acid precursor compound removed in Step (c) is at least about 50 percent by weight of the total amount of the one or more gaseous acid compound and/or gaseous acid precursor compound present in the flue gas stream prior to Step (c).

17. The method of claim 11, wherein the at least one additional gaseous acid compound and/or gaseous acid precursor compound removed in Step (c) is selected from $SO_x$, $NO_x$, hydrogen fluoride, hydrogen chloride, hydrogen bromide, carbon dioxide, sulfur-based acids, hydrochloric acid, hydrofluoric acid, hydrobromic acid, nitric acid, carbonic acid, or mixtures of any two or more thereof.

18. The method of claim 11, wherein Step (d) involves recycling at least 50 percent by weight of the liquid-based acidic waste stream from Step (c) to the at least one flue gas treatment device of Step (b) for treatment, or neutralization, therein.

19. The method of claim 11, wherein the method further comprises send the remaining portion of the liquid-based acidic waste stream from Step (c) to at least one waste water treatment process via at least one by-pass, or overflow, line.

20. The method of claim 11, wherein the at least one additional emissions control and/or flue gas treatment technology of Step (e) comprises mercury capture via a mercury capture process.

21. A method for treating one or more acidic compounds generated during an oxy-combustion process, the method comprising the steps of:
(I) generating a flue gas stream as a result of the oxy-combustion of at least one carbonaceous fuel, wherein the flue gas stream contains at least one type of gaseous acid compound and/or gaseous acid precursor compound;
(II) treating the flue gas stream to remove at least a portion of at least one gaseous acid compound and/or gaseous acid precursor compound present therein via the use of at least one flue gas treatment device;
(III) subjecting the flue gas stream from Step (II) to at least one compression step and/or cooling step so as to remove at least one additional gaseous acid compound and/or gaseous acid precursor compound present therein, wherein the compression step and/or cooling step yields a liquid-based acidic waste stream generated as a result of the removal of the at least one gaseous acid compound and/or gaseous acid precursor compound and an acid-depleted, or acid-lean, flue gas stream;
(IV) recycling at least a portion of the liquid-based acidic waste stream to the at least one flue gas treatment device of Step (II) for treatment, or neutralization, therein;
(V) subjecting the acid-depleted, or acid-lean, flue gas stream to at least one additional emissions control and/or flue gas treatment technology; and
(VI) subjecting the acid-depleted, or acid-lean, flue gas stream to carbon dioxide recovery so as to recover a majority of the carbon dioxide present in the acid-depleted, or acid-lean, flue gas stream prior to the release of a portion of the remaining acid-depleted, or acid-lean, flue gas stream to the atmosphere,
wherein the liquid-based acidic waste stream is split into at least two liquid-based acidic waste streams, a portion of each split liquid-based waste stream then being subjected to recycling in the at least one flue gas treatment device of Step (II) for treatment, or neutralization, therein.

22. The method of claim 21, wherein the oxy-combustion process is a coal-based oxy combustion process.

23. The method of claim 21, wherein the oxy-combustion process is a low sulfur coal-based oxy-combustion process.

24. The method of claim 21, wherein Step (II) comprises removing $SO_x$ via one or more devices selected from wet flue gas desulfurization processes, dry flue gas desulfurization processes, spray-dry scrubbing processes, wet sulfuric acid processes designed to recover commercial quality sulfuric acid, SNOX flue gas desulfurization processes that are designed to remove sulfur dioxide, nitrogen oxides and particulates from flue gases, direct contact cooler-polishing scrubber processes, or a combination of any two or more thereof.

25. The method of claim 21, wherein the pH of the liquid-based acidic waste stream is between about −1 to about 3.5.

26. The method of claim 21, wherein the amount of the one or more additional gaseous acid compound and/or gaseous acid precursor compound removed in Step (III) is at least about 50 percent by weight of the total amount of the one or more gaseous acid compound and/or gaseous acid precursor compound present in the flue gas stream prior to Step (III).

27. The method of claim 21, wherein the at least one additional gaseous acid compound and/or gaseous acid precursor compound removed in Step (III) is selected from $SO_x$, $NO_x$, hydrogen fluoride, hydrogen chloride, hydrogen bromide, carbon dioxide, sulfur-based acids, hydrochloric acid, hydrofluoric acid, hydrobromic acid, nitric acid, carbonic acid, or mixtures of any two or more thereof.

28. The method of claim 21, wherein Step (IV) involves recycling at least 50 percent by weight of the liquid-based acidic waste stream from Step (III) to the at least one flue gas treatment device of Step (II) for treatment, or neutralization, therein.

29. The method of claim 21, wherein the method further comprises send the remaining portion of the liquid-based acidic waste stream from Step (III) to at least one waste water treatment process via at least one by-pass, or overflow, line.

30. The method of claim 21, wherein the at least one additional emissions control and/or flue gas treatment technology of Step (V) comprises mercury capture via a mercury capture process.

31. The method of claim 21, wherein at least one of the at least two liquid-based acidic waste streams is a low pH stream and at least one of the at least two liquid-based acidic waste streams is a high pH stream.

32. The method of claim 31, wherein the at least one low pH liquid-based acidic waste stream has a pH of less than about 1.

33. The method of claim 31, wherein the at least one high pH liquid-based acidic waste stream has a pH of at least about 3.

* * * * *